(12) United States Patent
Takayanagi et al.

(10) Patent No.: US 12,469,298 B2
(45) Date of Patent: Nov. 11, 2025

(54) INFORMATION PROCESSING APPARATUS AND INFORMATION PROCESSING METHOD FOR GENERATING CROWD-AVOIDANCE PATH PLANS

(71) Applicant: SONY GROUP CORPORATION, Tokyo (JP)

(72) Inventors: Takayoshi Takayanagi, Tokyo (JP); Shohei Yamamoto, Tokyo (JP); Kenta Kawamoto, Tokyo (JP); Kohei Urushido, Tokyo (JP); Shun Lee, Tokyo (JP); Kazumi Aoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 365 days.

(21) Appl. No.: 17/789,752

(22) PCT Filed: Dec. 25, 2020

(86) PCT No.: PCT/JP2020/048723
§ 371 (c)(1),
(2) Date: Jun. 28, 2022

(87) PCT Pub. No.: WO2021/140953
PCT Pub. Date: Jul. 15, 2021

(65) Prior Publication Data
US 2023/0043836 A1 Feb. 9, 2023

(30) Foreign Application Priority Data

Jan. 8, 2020 (JP) ................ 2020-001591

(51) Int. Cl.
*G06V 20/52* (2022.01)
*G06V 40/10* (2022.01)

(52) U.S. Cl.
CPC .............. *G06V 20/53* (2022.01); *G06V 40/10* (2022.01)

(58) Field of Classification Search
None
See application file for complete search history.

(56) References Cited

U.S. PATENT DOCUMENTS

2010/0305858 A1 12/2010 Richardson
2016/0253740 A1* 9/2016 Goulart .................. G06Q 90/20
705/26.8

(Continued)

FOREIGN PATENT DOCUMENTS

CN 108271115 A 7/2018
CN 108983806 A 12/2018

(Continued)

OTHER PUBLICATIONS

English translation of JP-2014064241-A. (Year: 2014).*

(Continued)

*Primary Examiner* — Thomas D Lee
(74) *Attorney, Agent, or Firm* — CHIP LAW GROUP

(57) ABSTRACT

An information processing apparatus includes a Central Processing Unit (CPU) that detects a crowd based on images and location information, receives event information from a server, generates crowd information based on the detected crowd and the event information received from the server, and generates a cost map indicating a risk of passing through a region based on the crowd information.

15 Claims, 14 Drawing Sheets

(56) References Cited

U.S. PATENT DOCUMENTS

| | | | |
|---|---|---|---|
| 2017/0341746 A1* | 11/2017 | Erickson | G06N 7/01 |
| 2018/0038695 A1 | 2/2018 | Bitra et al. | |
| 2018/0333853 A1* | 11/2018 | Cousins | G01C 21/3691 |
| 2019/0122037 A1 | 4/2019 | Russell | |
| 2019/0176333 A1 | 6/2019 | Hager, IV | |

FOREIGN PATENT DOCUMENTS

| | | | |
|---|---|---|---|
| CN | 110083163 A | | 8/2019 |
| JP | 2014064241 A | * | 4/2014 |
| JP | 2018-185596 A | | 11/2018 |
| JP | 2019-031164 A | | 2/2019 |
| JP | 2019-121056 A | | 7/2019 |

OTHER PUBLICATIONS

International Search Report and Written Opinion of PCT Application No. PCT/JP2020/048723, issued on Feb. 22, 2021, 09 pages of ISRWO.

* cited by examiner

FIG. 2

| INFORMATION USED TO GENERATE COST MAP | CONTENT (FORM) | APPLICATION |
|---|---|---|
| IMAGE IMAGED BY DRONE OR SURVEILLANCE CAMERA | IMAGE | USED TO DETECT CROWD USING IMAGE AND TO SET COST OF REGION APPEARING IN IMAGE |
| LOCATION INFORMATION OF DRONE OR SURVEILLANCE CAMERA | COORDINATES (LATITUDE, LONGITUDE, AND THE LIKE) | USED TO REGISTER, IN COST MAP, COST SET USING IMAGE |
| WEATHER INFORMATION MEASURED (OBSERVED) BY DRONE | MEASURED VALUE OF ANEMOMETER (WIND VELOCITY SENSOR) | USED TO ESTIMATE RISK OF FLIGHT AT POINT FROM WIND VELOCITY OR THE LIKE, AND TO SET COST TO INDICATE RISK |
| SMARTPHONE LOCATION INFORMATION | GPS INFORMATION ACQUIRED BY SMARTPHONE | USED TO DETECT CROWD IN REGION AND THE LIKE NOT IMAGED BY CAMERA |
| EVENT INFORMATION | EVENT VENUE COORDINATES AND DATE AND TIME | USED TO DETERMINE (ESTIMATE) WHAT SORT OF CROWD IT IS WHEN ONE IS DETECTED (WHETHER TO BE TRANSIENT OR DUE TO DAY-LONG EVENT) |

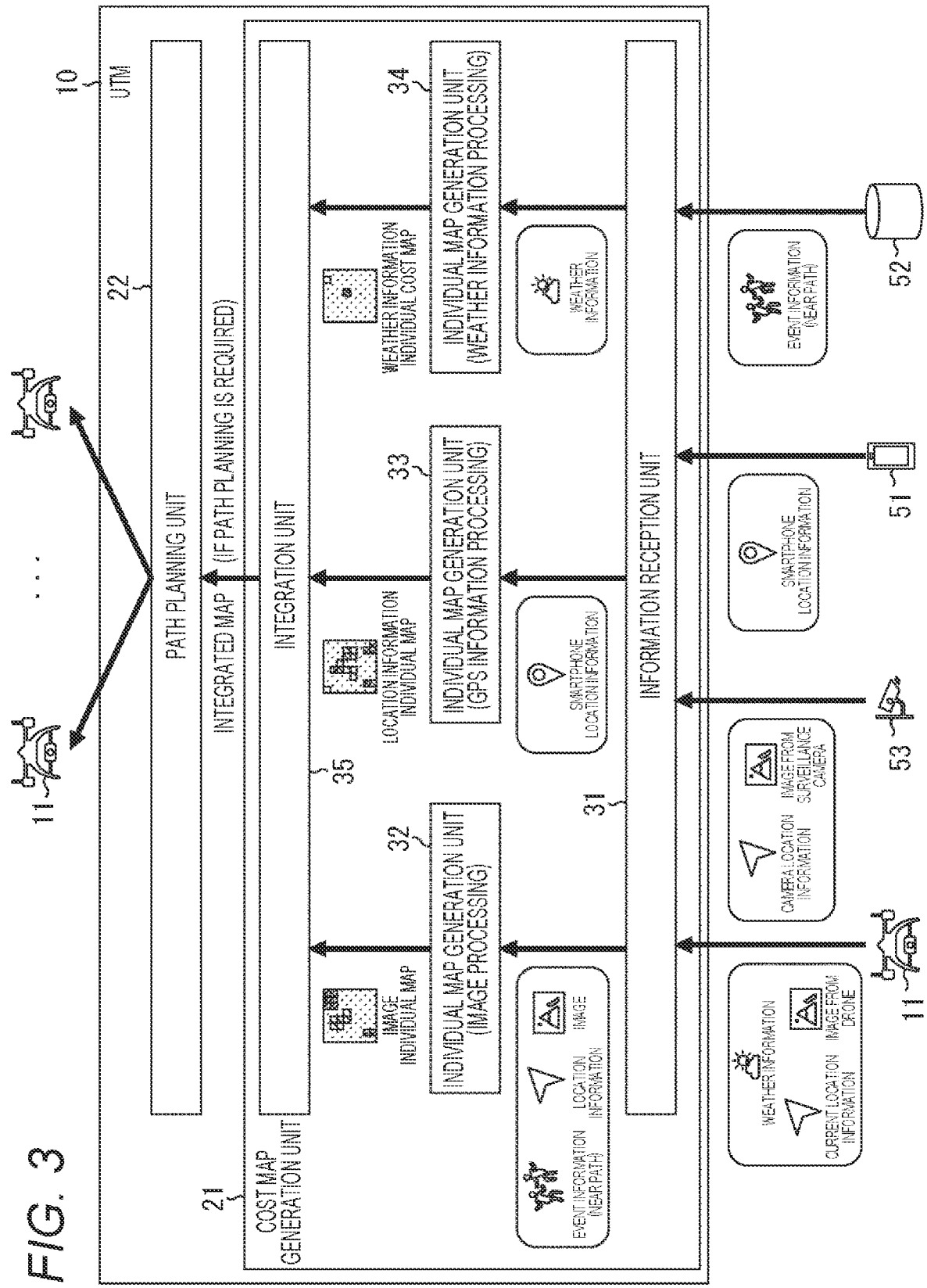

FIG. 9
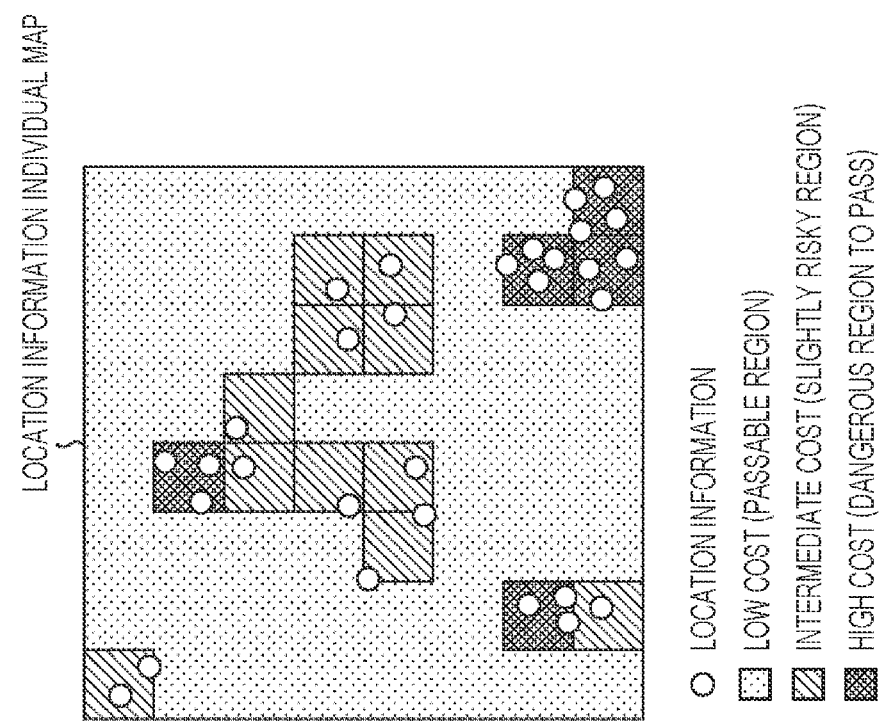
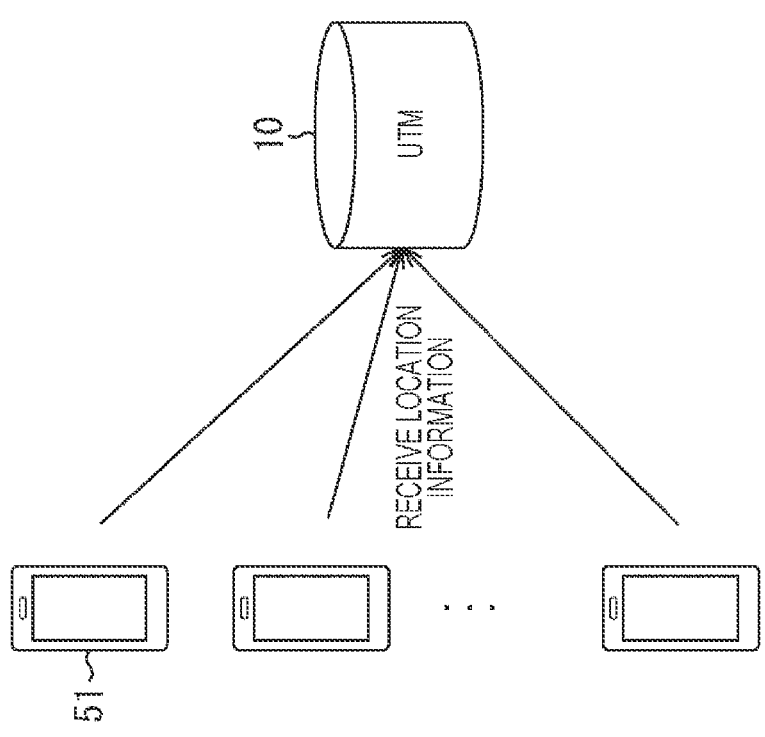

INFORMATION PROCESSING APPARATUS AND INFORMATION PROCESSING METHOD FOR GENERATING CROWD-AVOIDANCE PATH PLANS

CROSS REFERENCE TO RELATED APPLICATIONS

This application is a U.S. National Phase of International Patent Application No. PCT/JP2020/048723 filed on Dec. 25, 2020, which claims priority benefit of Japanese Patent Application No. JP 2020-001591 filed in the Japan Patent Office on Jan. 8, 2020. Each of the above-referenced applications is hereby incorporated herein by reference in its entirety.

TECHNICAL FIELD

The present technology relates to an information processing apparatus, an information processing method, and a program, and relates to, for example, an information processing apparatus, an information processing method, and a program capable of making a path plan avoiding a crowd.

BACKGROUND ART

For example, Patent Document 1 proposes an information provision device that narrows down object information to be distributed to a mobile body.

The information provision device of Patent Document 1 acquires object information from an outside recognition result by an outside recognition device installed in a mobile body or an environment where a mobile body acts, and generates an object map stored by associating the object information with map information. Moreover, the information provision device searches for objects present in a route from path information acquired from the mobile body, calculates prediction time when the mobile body arrives at each searched object, then obtains presence probabilities of the objects at the prediction time, and distributes only the objects with the presence probability being equal to or more than a predetermined value to the mobile body as object information.

Note that the information provision device of Patent Document 1 can acquire, as object information, an event occurring in future from, for example, a schedule of events such as loading and soil discharging of a dump truck, which is a mobile body.

CITATION LIST

Patent Document

Patent Document 1: Japanese Patent Application Laid-Open No. 2018-185596

SUMMARY OF THE INVENTION

Problems to be Solved by the Invention

As a path plan for a mobile body to move, it is safe if possible to make a path plan avoiding a crowd.

The present technology has been made in view of such a situation, and an object thereof is to make it possible to make a path plan avoiding a crowd.

Solutions to Problems

An information processing apparatus or a program of the present technology is an information processing apparatus including a cost map generation unit that generates a cost map indicating a risk of passing through a region by using crowd information or a program for causing a computer to function as such an information processing apparatus.

An information processing method of the present technology is an information processing method including generating a cost map indicating a risk of passing through a region by using crowd information.

In the information processing apparatus, the information processing method, and the program of the present technology, a cost map indicating a risk of passing through a region is generated using crowd information.

Note that the information processing apparatus may be an independent apparatus or an internal block constituting one apparatus.

Furthermore, the program can be provided by being recorded on a recording medium or transmitted via a transmission medium.

BRIEF DESCRIPTION OF DRAWINGS

FIG. 2 is a view presenting an example of information used for generation of a cost map.

FIG. 3 is a block diagram presenting a configuration example of UTM 10.

FIG. 9 is a diagram illustrating an example of generation of a location information individual map in an individual map generation unit 33.

MODE FOR CARRYING OUT THE INVENTION

<Embodiment of UTM to which Present Technology is Applied>

Figure 1:
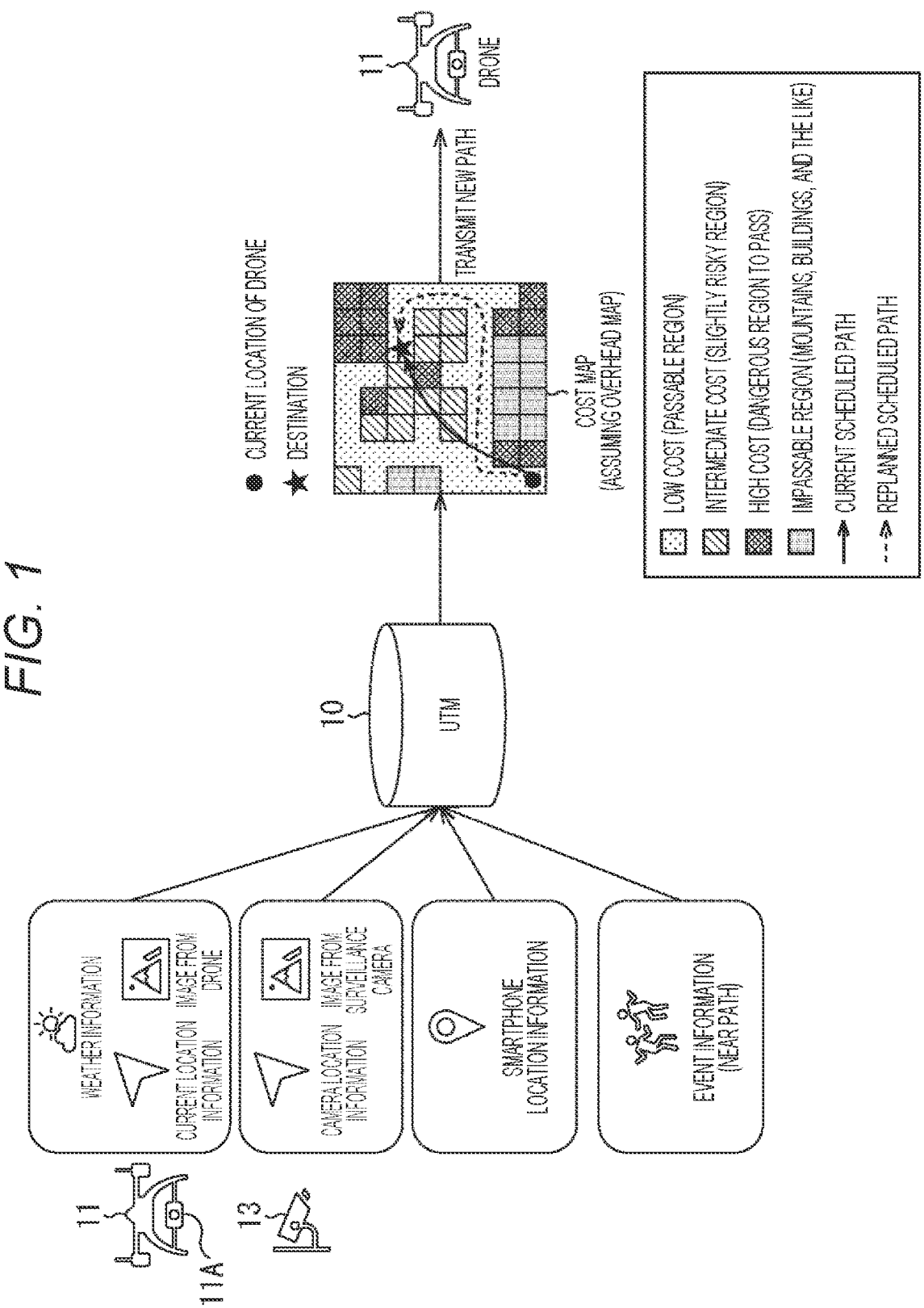
FIG. 1 is a diagram illustrating an outline of UTM as an information processing apparatus to which the present technology is applied.

FIG. 1 is a diagram illustrating an outline of UTM as an information processing apparatus to which the present technology is applied.

In FIG. 1, UAV traffic management (UTM) 10 generates a cost map in which a cost indicating a risk of passing through a region is registered by using crowd information regarding a crowd. Then, using the cost map, the UTM 10 generates a path plan of a mobile body, for example, a drone 11, which is an unmanned aerial vehicle (UAV), and transmits the path plan to the drone 11, thereby controlling the drone 11.

Note that in the present embodiment, the drone 11, which is a UAV, is adopted as a mobile body for which a path plan is to be generated, but the path plan can be generated for, for example, a mobile body that moves underwater or on land (ground surface), a mobile body that moves in outer space, and the like.

The UTM 10 can generate a cost map using information of one type of modal or information of a plurality of types of modal. The information of one type of modal or at least information of one type of modal of information of the plurality of types of modal includes information from which crowd information can be generated. In the present embodiment, the information from which crowd information can be generated is, for example, an image imaged by the drone 11 as described later, an image imaged by the surveillance camera 13, location information of a mobile terminal, and event information.

Note that the information from which crowd information can be generated is not limited to images, location information of a mobile terminal, and event information.

In FIG. 1, the UTM 10 acquires an image, location information of a mobile terminal, weather information regarding weather, and event information regarding an event where people gather as information of a plurality of types of modal.

The UTM 10 acquires an image from the one or more drones 11 flying in various locations controlled by UTM 10, for example. The drone 11 is equipped with, for example, a camera 11A, and transmits an image imaged by the camera 11A to the UTM 10. In this manner, the UTM 10 receives the image imaged by (the camera 11A equipped on) the drone 11 transmitted from the drone 11.

The UTM 10 acquires an image imaged by, for example, surveillance cameras installed in various places, in particular, for example, a surveillance camera 13 installed near a path in a path plan generated for the drone 11 controlled by the UTM 10.

The UTM 10 acquires, from a smartphone, location information of the smartphone as a mobile terminal, for example. As the location information of the smartphone, it is possible to adopt, for example, global positioning system (GPS) information acquired by a GPS function equipped on the smartphone in a format used in Google Map of Google Inc.

For example, in a case where the drone 11 is equipped with an anemometer (wind velocity sensor), the UTM 10 acquires, as weather information, the wind velocity measured by the anemometer. That is, in a case where the drone 11 is equipped with the anemometer, the drone 11 transmits the wind velocity measured by the anemometer to the UTM 10 as weather information. In this manner, the UTM 10 receives the weather information transmitted from the drone 11. Note that the weather information can be acquired not only from the drone 11 but also from sensors detecting physical quantities related to weather installed in various places, such as an anemometer.

The UTM 10 acquires event information from a web server, for example. The UTM 10, in particular, receives, from the web server, event information regarding events that are actually taking place near the path in the path plan generated for the drone 11 controlled by the UTM 10, for example, and that will take place. The event information includes the venue (place of taking place) and the date and time of the event.

The UTM 10 not only acquires images and weather information from the drone 11 but also acquires location information and the like of the current location of the drone 11. Furthermore, the UTM 10 not only acquires an image from the surveillance camera 13 but also acquires location information and the like of the location where the surveillance camera 13 is installed.

The UTM 10 generates crowd information using information acquired by the UTM 10, and uses the crowd information to set, for a region, a cost indicating a risk of passing through the region. Then, the UTM 10 generates a cost map in which a cost for the region is registered.

In FIG. 1, a cost map in which costs are set for a region on an overhead map is generated. Furthermore, in FIG. 1, three levels of low, intermediate, and high costs are adopted as the cost, and the higher the cost is, the higher the risk of passing through the region for which the cost is set. Note that as the cost, in addition to the three levels of low, intermediate, and high costs, two levels of low and high costs, and four or more levels of costs can be adopted.

The cost map is a map in which a cost indicating a risk of passing through each region is registered for a predetermined range of region, for example.

In the cost map, for example, the entire earth can be adopted as a region (hereinafter, also referred to as registration region) for which the cost is registered, and in a case where the flight range of the drone 11 is set in advance, the region of the flight range can be adopted. In addition, a region set by an administrator or the like of the UTM 10 can be adopted as the registration region.

In the cost map, for example, a cost indicating the risk of passing through each divided region is registered for the divided region in which the registration region is divided into regions of a predetermined size.

Note that, in the cost map, for example, for a registration region in which a high object such as a mountain having an elevation equal to or greater than a predetermined value or a building having a height equal to or greater than a predetermined height is present, it is possible to register in advance that it is not possible to pass through the registration region (impassable region).

The UTM 10 generates or updates the cost map regularly or irregularly. Moreover, the UTM 10 generates or regenerates a new path plan for the drone 11 using the cost map as necessary, and transmits the path plan to the drone 11.

Since the cost map is generated using crowd information, the UTM 10 can make a path plan avoiding a crowd.

Furthermore, since the cost map is generated regularly or irregularly, by generating a path plan using a latest cost map, the drone 11 can fly flexibly according to the latest situation (ideally, real-time situation).

FIG. 2 is a view presenting an example of information used for generation of a cost map.

FIG. 2 presents information used to generate the cost map, the content or form and the application of the information.

Images imaged by the drone 11 and the surveillance camera 13 (hereinafter, also referred to as imaged images) can be used to generate the cost map. As the form (format) of the imaged image, an arbitrary image form can be adopted. The imaged image can be used to detect a crowd and set a cost of a region appearing in the imaged image.

Location information of the drone 11 and the surveillance camera 13 can be used to generate the cost map. As a form of the location information of the drone 11 and the surveillance camera 13, coordinates representing the location, for example, latitude, longitude, and the like can be adopted. The location information of the drone 11 and the surveillance camera 13 can be used to register (specify the location of the region for which the cost is set), into the cost map, the cost set using the imaged images imaged by the drone 11 and the surveillance camera 13.

Weather information measured (observed) by the drone 11 can be used to generate the cost map. As the weather information, for example, a measured value of an anemometer (wind velocity sensor) equipped on the drone 11 can be adopted. The measured value of the anemometer as the weather information can be used to estimate the risk for the drone 11 to fly at the point where the measured value (wind velocity) is measured and to set the cost representing the risk.

Location information of the smartphone as a mobile terminal can be used to generate the cost map. As the location information of the smartphone, GPS information acquired by the GPS function equipped on the smartphone can be adopted. The location information of the smartphone can be used to detect a crowd in a region or the like not imaged by the camera 11A equipped on the drone 11 and the surveillance camera 13 and to set the cost of the region where the crowd exists.

Event information can be used to generate the cost map. As the event information, information including (the coordinates of) the venue of the event and the date and time of the event can be adopted. The event information can be used, for example, to determine (estimate) what sort of crowd or what has caused the crowd the crowd detected from an imaged image imaged by the drone 11 is, for example, whether to be transient or due to day-long event.

<Configuration Example of UTM 10>

FIG. 3 is a block diagram presenting a configuration example of the UTM 10 in FIG. 1.

In FIG. 3, the UTM 10 has a cost map generation unit 21 and a path planning unit 22.

The cost map generation unit 21 generates a cost map using information of one or more types of modal and supplies the cost map to the path planning unit 22.

The information used by the cost map generation unit 21 to generate the cost map includes information from which crowd information can be generated.

The cost map generation unit 21 generates crowd information by using, among information of one or more types of modal, at least information from which crowd information can be generated, and generates the cost map by using the crowd information.

The cost map generation unit 21 has an information reception unit 31, individual map generation units 32, 33, and 34, and an integration unit 35.

By receiving the imaged image, the weather information, the current location information of the drone 11, and the like from the drone 11, the information reception unit 31 acquires them.

Furthermore, by receiving the imaged image, the location information of surveillance camera 13, and the like from the surveillance camera 13, the information reception unit 31 acquires them.

Moreover, by receiving the location information of a plurality of smartphones 51 from the smartphones 51 carried by a plurality of persons, the information reception unit 31 acquires them.

Furthermore, by accessing a web server 52 and searching for the event information, the information reception unit 31 acquires it.

Here, since the information acquired by the information reception unit 31 is used to generate the cost map, the information is hereinafter also referred to as information for map.

The information reception unit 31 supplies necessary information for map to a necessary block among the individual map generation units 32 to 34.

For example, the information reception unit 31 supplies, to the individual map generation unit 32, an imaged image, location information of the imaged image (location information of the drone 11 or the surveillance camera 13 that has imaged the imaged image), and event information.

Furthermore, the information reception unit 31 supplies the location information of the plurality of smartphones 51 to the individual map generation unit 33.

Moreover, the information reception unit 31 supplies the weather information to the individual map generation unit 34.

By performing image processing of processing the imaged image from the information reception unit 31, the individual map generation unit 32 generates and supplies, to the integration unit 35, an image individual map that is an individual cost map for the image (imaged image) as information of a first modal.

When generating the image individual map, the individual map generation unit 32 uses the location information of the imaged image and the event information from the information reception unit 31 as necessary.

By performing location information processing of processing the location information of the smartphone 51 from the information reception unit 31, the individual map generation unit 33 generates and supplies, to the integration unit 35, a location information individual map that is an individual cost map for the location information (of the smartphone 51) as information of a second modal.

By performing weather information processing of processing the weather information from the information reception unit 31, the individual map generation unit 34 generates and supplies, to the integration unit 35, a weather information individual map that is an individual cost map for the weather information as information of a third modal.

The integration unit 35 integrates the image individual map from the individual map generation unit 32, the location information individual map from the individual map generation unit 33, and the weather information individual map from the individual map generation unit 34, and generates and supplies, to the path planning unit 22, an integrated map, which is a final cost map.

The path planning unit 22 generates and transmits, to the drone 11, a path plan using the integrated map from the integration unit 35.

<Processing of UTM 10>

Figure 4:
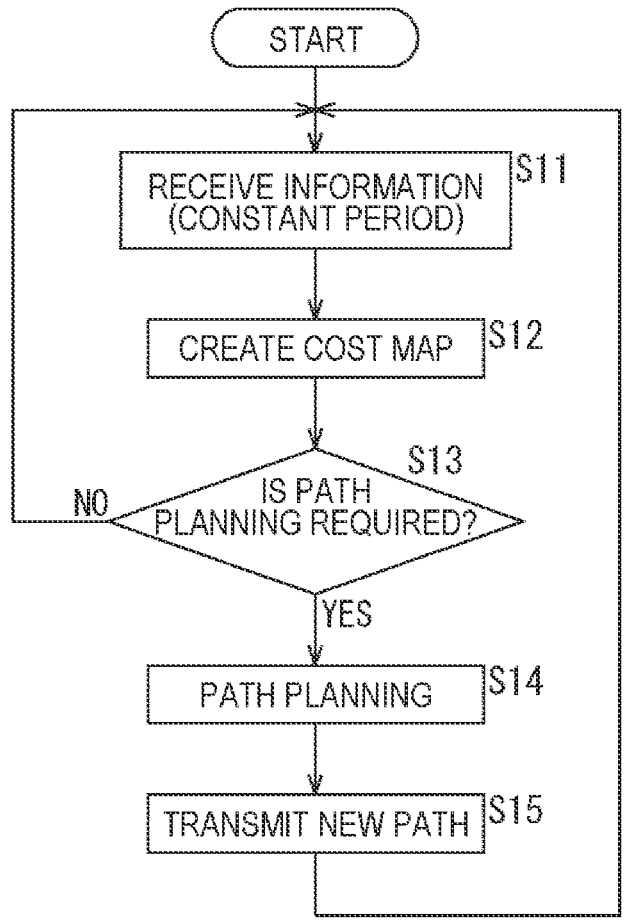
FIG. 4 is a flowchart illustrating an example of processing of the UTM 10.

FIG. 4 is a flowchart illustrating an example of the processing of the UTM 10 of FIG. 3.

In step S11, in the UTM 10, the information reception unit 31 of the cost map generation unit 21 waits for a constant period (time) to elapse and receives information for map, and the processing proceeds to step S12.

In step S12, using the information for map, the cost map generation unit 21 generates and supplies, to the path planning unit 22, an integrated map, which is a final cost map, and the processing proceeds to step S13.

In step S13, the path planning unit 22 determines whether it is necessary to generate or regenerate the path plan.

In a case where it is determined in step S13 that it is not necessary to generate and regenerate the path plan, the processing returns to step S11, and similar processing is repeated thereafter.

Furthermore, in a case where it is determined in step S13 that it is necessary to generate or regenerate the path plan, the processing proceeds to step S14.

In step S14, the path planning unit 22 generates a path plan using the latest cost map from the cost map generation unit 21, and the processing proceeds to step S15.

For example, in a case where the three levels of low, intermediate, and high costs are adopted as the cost, the path planning unit 22 permits passage through only a region with low cost on the cost map and searches for one or more paths to the destination.

In a case where it is possible to reach the destination with a path that permits passage through only the region with low cost, and the length of the path is equal to or less than a permissible length (for example, a predetermined number of times of a straight-line distance from the current location to the destination, or the like) that is a length permitted in advance, the path planning unit 22 selects, as a generation result of the path planning, a path with the smallest length from among the searched paths.

In a case where it is not possible to reach the destination with a path that permits passage through only the region with low cost, or in a case where the length of the path exceeds the permissible length, the path planning unit 22 permits passage through a region with intermediate cost in addition to the region with low cost on the cost map, and searches for one or more paths to the destination.

In a case where it is possible to reach the destination with a path that permits passage through a region with low cost and a region with intermediate cost, the path planning unit 22 selects, from among the searched paths, as a generation result of the path planning, a path in which the length for passing through the region with intermediate cost is the smallest. Alternatively, from among the searched paths, the path planning unit 22 selects, as a generation result of the path planning, a path in which the length for passing through the region with intermediate cost is as short as possible and the total length is as short as possible. For example, the path planning unit 22 selects, as a generation result of the path planning, a path in which a weighted additional value of the length for passing through the region with intermediate cost and the length of the path is the smallest.

In a case where it is not possible to reach the destination with a path that permits passage through a region with low cost and a region with intermediate cost, the path planning unit 22 gives up the path planning. Alternatively, the path planning unit 22 searches for one or more paths to the destination while permitting passing through a region with low cost, a region with intermediate cost, and a region with high cost on the cost map. Then, the path planning unit 22 selects, among the searched paths, as a generation result of the path planning, a path in which the length for passing through the region with high cost is the smallest.

In step S15, the path planning unit 22 transmits the path plan generated in the immediately preceding step S14 to the drone 11. Then, the processing returns from step S15 to step S11, and similar processing is repeated thereafter.

Figure 5:
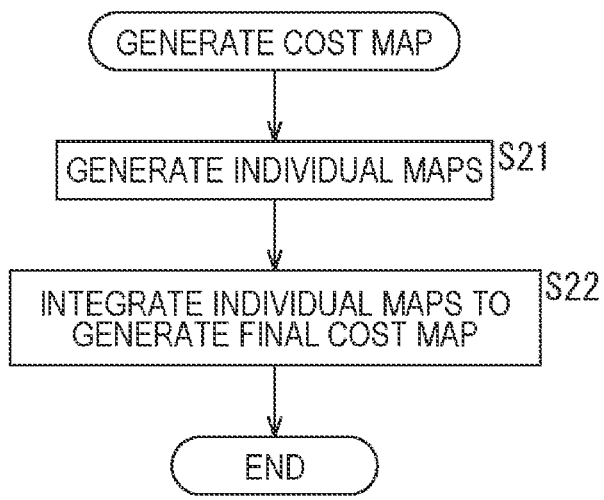
FIG. 5 is a flowchart illustrating an example of processing of generation of an integrated map (final cost map) in step S12.

FIG. 5 is a flowchart illustrating an example of the processing of generation of the integrated map (final cost map) in step S12 of FIG. 4.

In step S21, the information reception unit 31 of the cost map generation unit 21 supplies, to a necessary block among the individual map generation units 32 to 34, necessary information among the information for map received in step S11 of FIG. 4. The individual map generation units 32 to 34 generate and supply, to the integration unit 35, an image individual map, a location information individual map, and a weather information individual map, respectively, by using the information for map from the information reception unit 31, and the processing proceeds from step S21 to step S22.

In step S22, the integration unit 35 integrates the image individual map from the individual map generation unit 32, the location information individual map from the individual map generation unit 33, and the weather information individual map from the individual map generation unit 34, and generates an integrated map as a final cost map. Then, the integration unit 35 supplies the integrated map to the path planning unit 22, and the processing ends.

<Generation of Image Individual Map>

Figure 6:
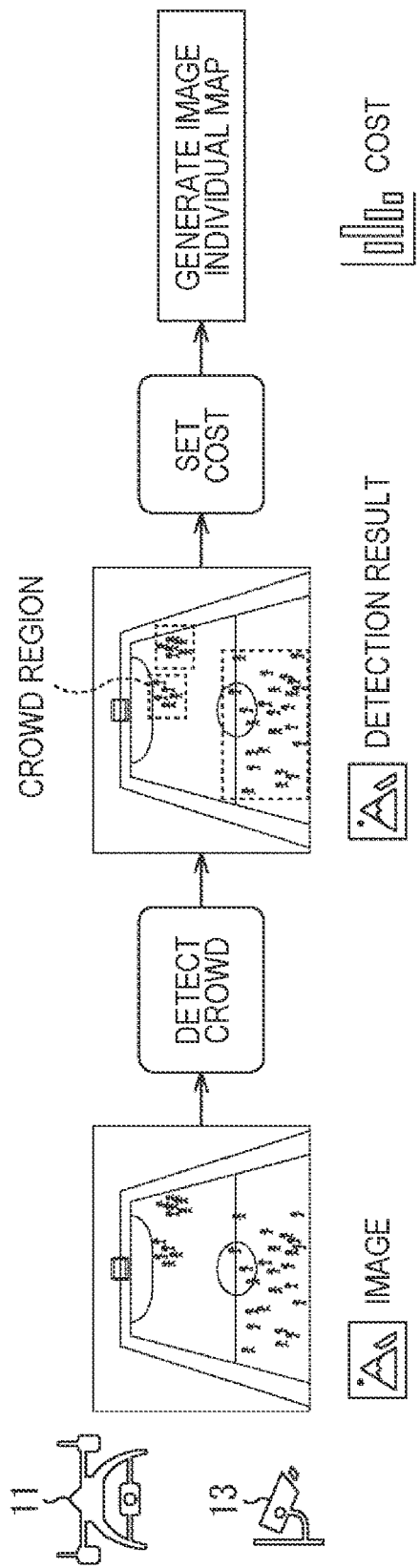
FIG. 6 is a diagram illustrating an example of generation of an image individual map in an individual map generation unit 32.

FIG. 6 is a diagram illustrating an example of generation of an image individual map in the individual map generation unit 32.

Using imaged images imaged by the drone 11 and surveillance camera 13, the individual map generation unit 32 detects a crowd appearing in the imaged images, and generates crowd information including (information indicating) the region where the crowd exists.

As a method of detecting a crowd using an imaged image, for example, it is possible to adopt a method of detecting a person from the imaged image, and detecting a gathering of people with equal to or greater than a predetermined density as a crowd according to a degree of the gathering of people, for example.

Furthermore, as a method of detecting a crowd using an imaged image, it is possible to adopt a method of detecting a crowd by, for example, performing learning of a neural network using, as learning data, an image with a crowd appearing therein and an image with no crowd appearing therein together with labels indicating presence or absence of crowd, and giving the imaged images as input to the learned neural network.

In a case where a crowd is detected from an imaged image, that is, in a case where the crowd appears in the imaged image, the individual map generation unit 32 detects a region where the crowd is present as a crowd region where the crowd is present, and generates crowd information indicating the crowd region.

Moreover, using the crowd information, the individual map generation unit 32 sets the cost indicating a risk that the drone 11 passes through the crowd region indicated by the crowd information.

For example, the individual map generation unit 32 sets the cost for the crowd region by threshold processing of the area according to (not the area of the crowd region in the imaged image but) the area of the crowd region in the real world. Note that the cost can be set according to the area of the crowd region in the real world, or can be set according to the area of the crowd region in the imaged image.

For example, the three levels of high, intermediate, and low costs are adopted in descending order of risk as the cost, and a first area threshold and a second area threshold larger than the first area threshold are adopted as two thresholds of area.

In a case where the area (in the real world) of the crowd region is equal to or less than the first area threshold, the cost is set to low. In a case where the area of the crowd region is greater than the first area threshold and equal to or less than the second area threshold, the cost is set to intermediate. In a case where the area of the crowd region is larger than the second area threshold, the cost is set to high.

The cost for a region other than the crowd region in the region appearing in the imaged image (hereinafter, also referred to as imaging region) is set to low, where the risk is the lowest, or is set to be undetermined. Hereinafter, the description of the setting of the cost for the region other than the crowd region will be omitted.

Note that the cost can be set according to (average) density or the like of people present in the crowd region, for example. For example, the cost can be set to a value with a higher risk as the density of people is higher. Furthermore, the cost can also be set according to the area of the crowd region and the density of people present in the crowd region, for example.

The individual map generation unit 32 sets the cost for the crowd region, and then, generates the image individual map by registering the cost into the cost map.

Figure 7:
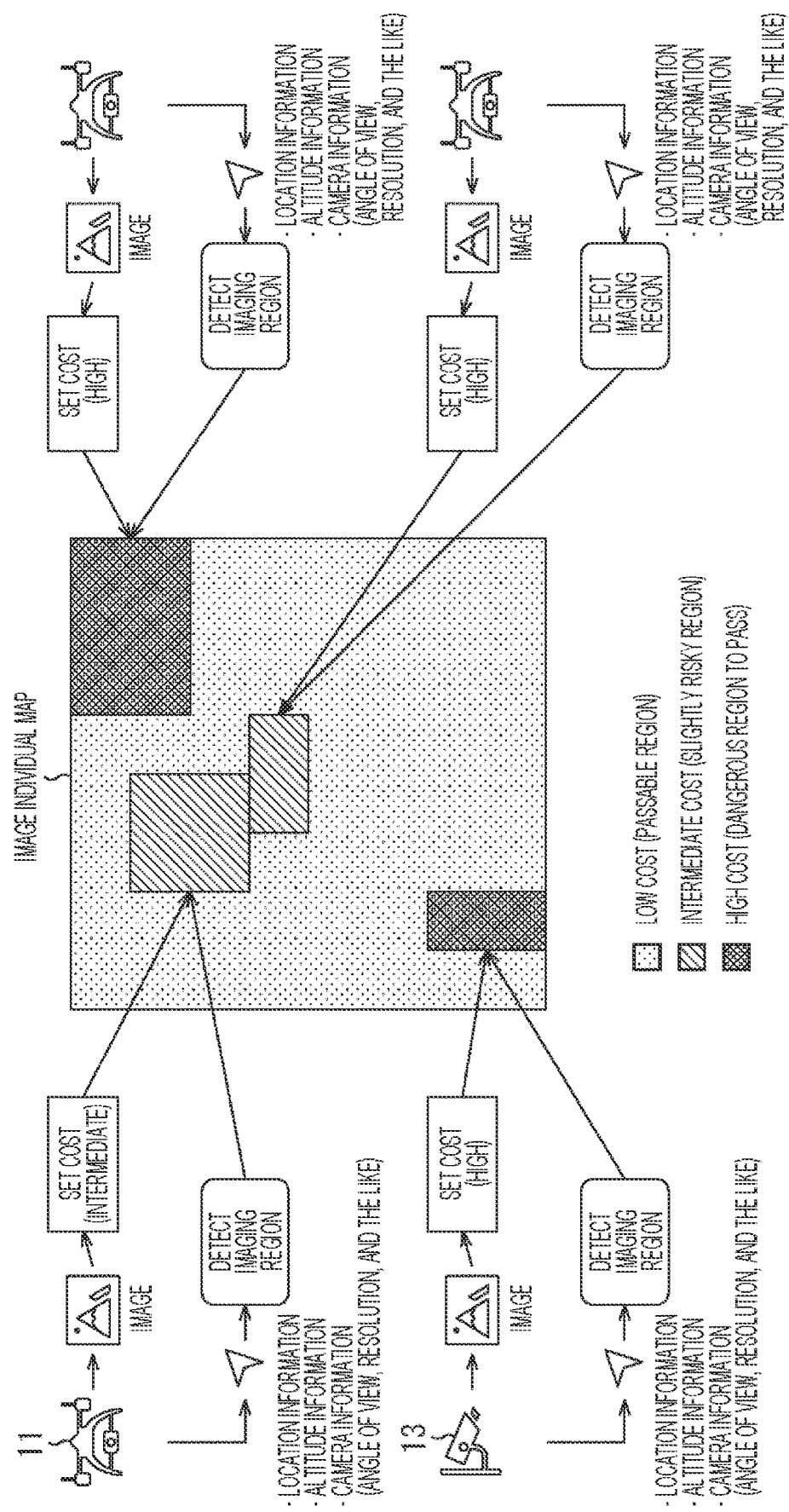
FIG. 7 is a diagram illustrating an example of registration of a cost into an image individual map.

FIG. 7 is a diagram illustrating an example of registration of a cost into an image individual map.

Using imaged images of the drone 11 and the surveillance camera 13, the individual map generation unit 32 sets the cost as described in FIG. 6.

Furthermore, the individual map generation unit 32 detects an imaging region (in the real world) appearing in the imaged images of the drone 11 and the surveillance camera 13.

Here, in addition to acquiring imaged images and the like from the drone 11 and the surveillance camera 13, the information reception unit 31 acquires and supplies, to the individual map generation unit 32, location information (for example, latitude and longitude), altitude (elevation) information, and camera information (angle of view, resolution, imaging direction, and the like) of the drone 11 and the surveillance camera 13.

The individual map generation unit 32 detects (the location and range of) the imaging region appearing in the imaged image using the location information, the altitude information, and the camera information of the drone 11 and the surveillance camera 13.

Then, the individual map generation unit 32 registers, for every divided region, the cost set using the imaged image with respect to the region corresponding to the imaging region in the registration region of the image individual map.

Here, among the costs registered in the image individual map, the cost set using the imaged image imaged by the drone 11 is maintained until the region appearing in the imaged image is imaged again by the drone 11, and is not updated (however, except a case where the region appearing in the imaged image is imaged by the surveillance camera 13 or the like).

Therefore, if, for example, in a case where an event where people gather, such as a fireworks display, a festival, or a sports event, is taking place in a predetermined region, the drone 11 images the predetermined region, whereby the cost is set to high and the predetermined region is registered in the image individual map, the cost remains registered to high in the image individual map unless the drone 11 flies near the predetermined region and images the predetermined region again after the event ends and no crowd is present in the predetermined region.

Therefore, regarding the cost set using the imaged image of (the mobile body such as) the drone 11 in the image individual map, it is possible to perform reset processing of resetting the cost to an initial value in a case where a certain period has elapsed from the registration of the latest cost. As the initial value of the cost, it is possible to adopt, for example, a value indicating that the risk is the lowest, a value indicating that the cost is undetermined, or the like.

As described above, by performing the reset processing, it is possible to prevent the cost from remaining registered to high in the image individual map even when the event ends and no crowd is present any more.

By the way, in the image individual map, in a case where the cost set using the imaged image of the drone 11 is reset to the initial value at the timing when a certain period has elapsed from the registration of the latest cost, the cost set using the imaged image of the drone 11 is reset even if the event continues and the crowd is present after a certain period has elapsed from the registration of the latest cost.

However, it is not desirable that the cost for the region where the crowd is present is reset in a case where the event continues and the crowd is present.

Therefore, the individual map generation unit 32 can restrict the resetting of the cost for the event region during the event registered in the image individual map by using the event information.

Figure 8:
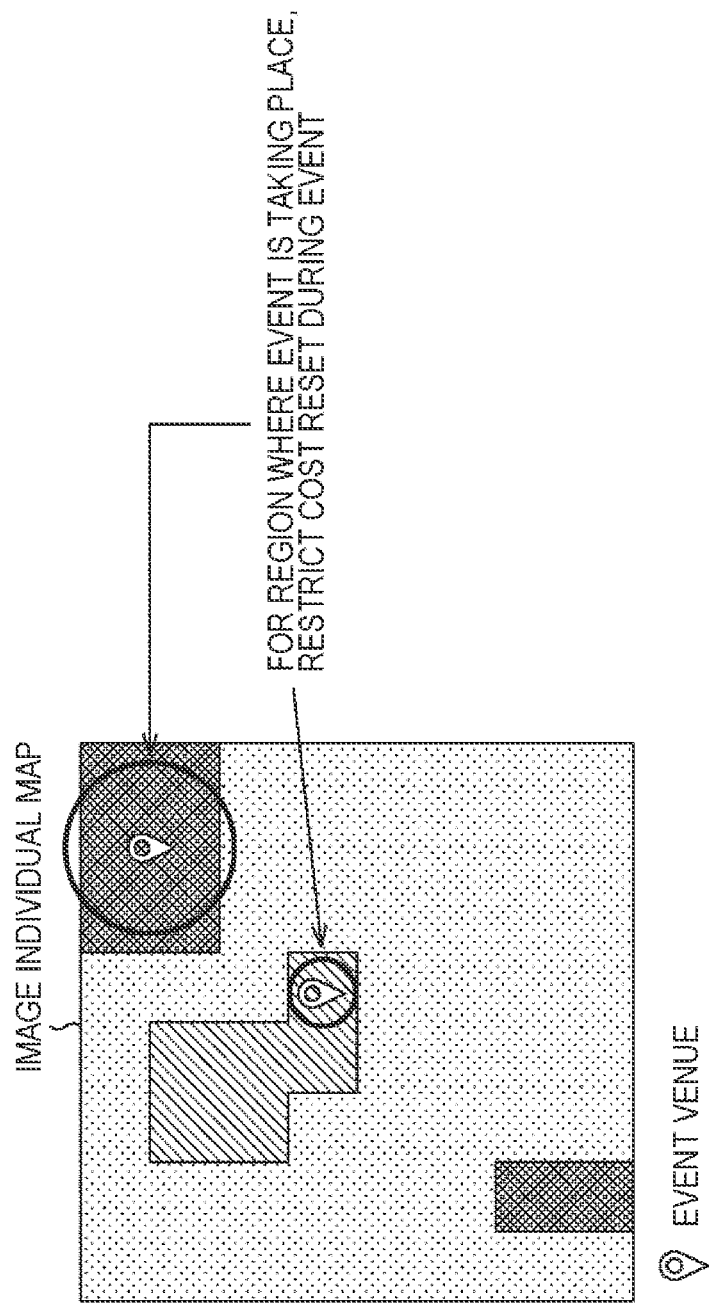
FIG. 8 is a diagram for explaining restriction on resetting of a cost for an event region during an event.

FIG. 8 is a diagram for explaining restriction on resetting of the cost for an event region during an event.

For example, the individual map generation unit 32 uses the event information to specify an event region where the event is taking place. Moreover, the individual map generation unit 32 resets the cost for the region for which a certain period has elapsed from the registration of the latest cost, targeting only the cost for a non-event region other than the event region during the event, in the image individual map generated immediately before.

Therefore, it is possible to prevent the cost for the event region during the event from being reset after a certain period of time elapses from the registration into the image individual map, that is, to restrict the reset of the cost for the event region during the event.

Note that the individual map generation unit 32 can reset the cost for the event region using the event information. For example, using the event information, the individual map generation unit 32 can specify the end date and time when the event taking place in the event region ends. Then, the individual map generation unit 32 can reset the cost for the event region in which the event has ended in the image individual map at the timing when the end date and time has elapsed.

The processing of generating or updating the image individual map in the individual map generation unit 32 is, for example, as follows.

The individual map generation unit 32 uses the latest imaged image to detect a crowd and uses a detection result of the crowd to generate crowd information indicating the crowd region.

Using the crowd information, the individual map generation unit 32 sets the cost for every divided region with respect to the imaging region appearing in the latest imaged image.

Using the event information, the individual map generation unit 32 performs reset processing of resetting, to the initial value, the cost for the region for which a certain period has elapsed from the registration of the latest cost, targeting only the cost registered in the non-event region, in the image individual map generated immediately before.

By performing the reset processing targeting only the cost registered in the non-event region, it is possible to prevent the cost registered for the region having a possibility that a crowd is present during the event from being reset.

The individual map generation unit 32 generates the latest image individual map (updates the image individual map) by updating, to the latest cost set using the latest imaged image, the cost for the region for which the latest cost is set using the latest imaged image among the costs registered in the image individual map after the reset processing.

That is, the individual map generation unit 32 overwrites and registers the latest cost set using the latest imaged image to the cost of the divided region for which the latest cost is set using the latest imaged image among the costs registered in the image individual map after the reset processing, thereby generating the latest image individual map.

Note that using the event information, the individual map generation unit 32 can generate an event information individual map, which is an individual cost map for the event information. For example, using the event information, the individual map generation unit 32 can specify an event region as a crowd region, and set a cost for the event region according to the area of the event region. Then, the individual map generation unit 32 can register the cost for the event region into the cost map and generate the event information individual map.

The event information individual map can be used for generation of the integrated map in the integration unit 35 together with the image individual map, the location information individual map, and the weather information individual map.

<Generation of Location Information Individual Map>

FIG. 9 is a diagram illustrating an example of generation of the location information individual map in the individual map generation unit 33.

Using the location information of the smartphone 51, the individual map generation unit 33 detects a crowd and generates the crowd information.

For example, with the location indicated by the location information of the smartphone 51 as a location where people are present, the individual map generation unit 33 detects a gathering of people with equal to or greater than a predetermined density as a crowd.

In a case where a crowd is detected from the location information from the smartphone 51, the individual map generation unit 33 detects the crowd region in which the crowd is present, and generates crowd information indicating the crowd region.

Moreover, using the crowd information, the individual map generation unit 33 sets the cost indicating a risk that the drone 11 passes through the crowd region indicated by the crowd information. The individual map generation unit 33 can set the cost similarly to the individual map generation unit 32.

The individual map generation unit 33 sets the cost for the crowd region, and then, generates the location information individual map by registering the cost into the cost map.

The individual map generation unit 33 can detect a crowd in a region that is not imaged (cannot be imaged) by the drone 11 or the surveillance camera 13, for example, set a cost indicating the risk of passing through the region, and generate the location information individual map as a cost map in which the cost is registered.

The processing of generating or updating the location information individual map in the individual map generation unit 33 is, for example, as follows.

The individual map generation unit 33 uses the latest location information of the smartphone 51 to detect a crowd and uses the detection result of the crowd to generate the crowd information.

Using the crowd information generated using the latest location information, the individual map generation unit 33 sets the cost for every divided region with respect to the registration region of the location information individual map.

The individual map generation unit 33 resets the cost of the location information individual map generated immediately before, and overwrites and registers the cost set using the latest location information into the location information individual map, thereby generating the latest location information individual map (updating the location information individual map).

<Generation of Weather Information Individual Map>

Figure 10:
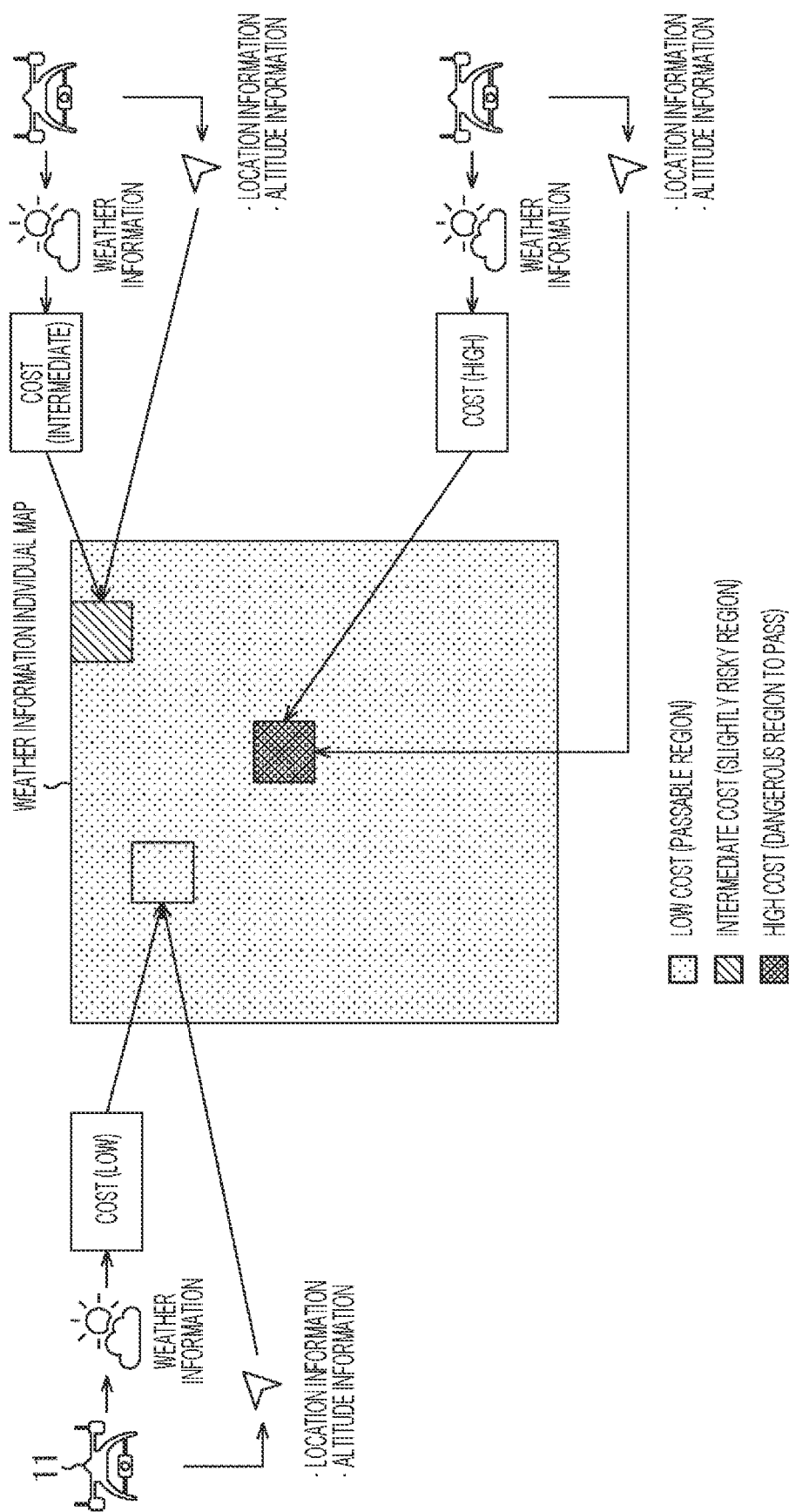
FIG. 10 is a diagram illustrating an example of generation of a weather information individual map in an individual map generation unit 34.

FIG. 10 is a diagram illustrating an example of generation of the weather information individual map in the individual map generation unit 34.

Using the weather information measured by the drone 11, the individual map generation unit 34 sets a cost indicating the risk that the drone 11 passes through a region including the location of the drone 11 where the weather information is measured, for example, an imaging region appearing in the imaged image imaged by the drone 11.

For example, the individual map generation unit 34 sets the cost for the imaging region by threshold processing of the wind velocity according to the wind velocity indicated by the weather information.

For example, the three levels of high, intermediate, and low costs are adopted in descending order of risk as the cost, and a first wind velocity threshold and a second wind velocity threshold larger than the first wind velocity threshold are adopted as two thresholds of wind velocity.

In a case where the wind velocity indicated by the weather information is equal to or less than the first wind velocity threshold, the cost is set to low. In a case where the wind velocity indicated by the weather information is greater than the first wind velocity threshold and equal to or less than the second wind velocity threshold, the cost is set to intermediate. In a case where the wind velocity indicated by the weather information is larger than the second wind velocity threshold, the cost is set to high.

Note that, in setting of the cost using the weather information, the cost can be set also using a rainfall amount, weather (sunny, rainy, snowy, and the like), and the like in addition to the wind velocity.

The individual map generation unit 34 sets the cost for the imaging region, and then, generates the weather information individual map by registering the cost into the cost map.

For the weather information individual map, it is possible to perform the reset processing similar to that performed for the image individual map.

The processing of generating or updating the weather information individual map in the individual map generation unit 34 is, for example, as follows.

Using the latest weather information, the individual map generation unit 34 sets the cost (for every divided region) with respect to the registration region of the weather information individual map.

The individual map generation unit 34 resets the cost of the weather information individual map generated immediately before, and overwrites and registers the cost set using the latest weather information into the weather information individual map, thereby generating the latest weather information individual map (updating the weather information individual map).

Alternatively, the individual map generation unit 34 overwrites and registers the latest cost set using the latest weather information into the cost of the divided region in which the latest cost is set using the latest weather information in the weather information individual map generated immediately before, thereby generating the latest weather information individual map.

As described above, by generating the weather information individual map using the weather information, it is possible to generate a path plan in consideration of the influence of the weather.

<Generation of Final Map>

Figure 11:
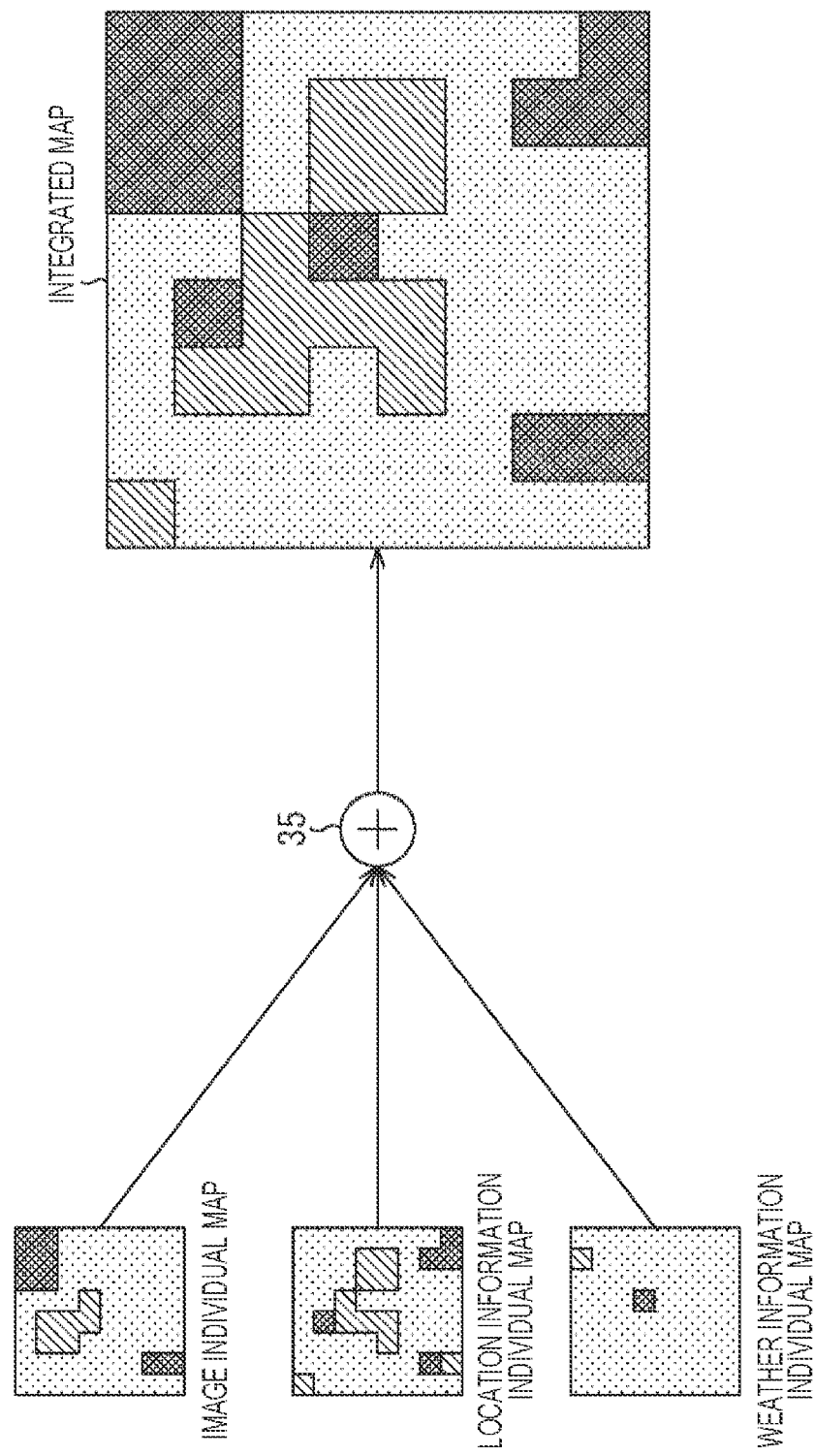
FIG. 11 is a diagram illustrating an example of generation of a final map in an integration unit 35.

FIG. 11 is a diagram illustrating an example of generation of a final map in the integration unit 35.

The integration unit 35 integrates the image individual map, the location information individual map, and the weather information individual map to generate an integrated map, which is a final cost map.

The integration unit 35 integrates (the costs registered in) the image individual map, the location information individual map, and the weather information individual map by selecting the highest cost (the cost indicating a higher risk) from the costs registered in the image individual map, the location information individual map, and the weather information individual map for every divided region where the registration region of the integrated map is divided.

That is, the integration unit 35 selects and registers, into the integrated map, the highest cost from the costs registered in the image individual map, the location information individual map, and the weather information individual map for every divided region where the registration region of the integrated map is divided.

As described above, by integrating, for example, the image individual map, the location information individual map, and the weather information individual map for the imaged image, the location information of the smartphone 51, and the weather information, respectively, as a plurality of pieces of modal information, it is possible to obtain an integrated map in which a significant cost with high accuracy is registered for a wide region including not only the imaging region appearing in the imaged image imaged by the drone 11 and the surveillance camera 13, for example, but also a region other than the imaging region. As a result, it is possible to generate a path plan that enables a safer flight.

<Another Example of Processing of UTM 10>

Figure 12:
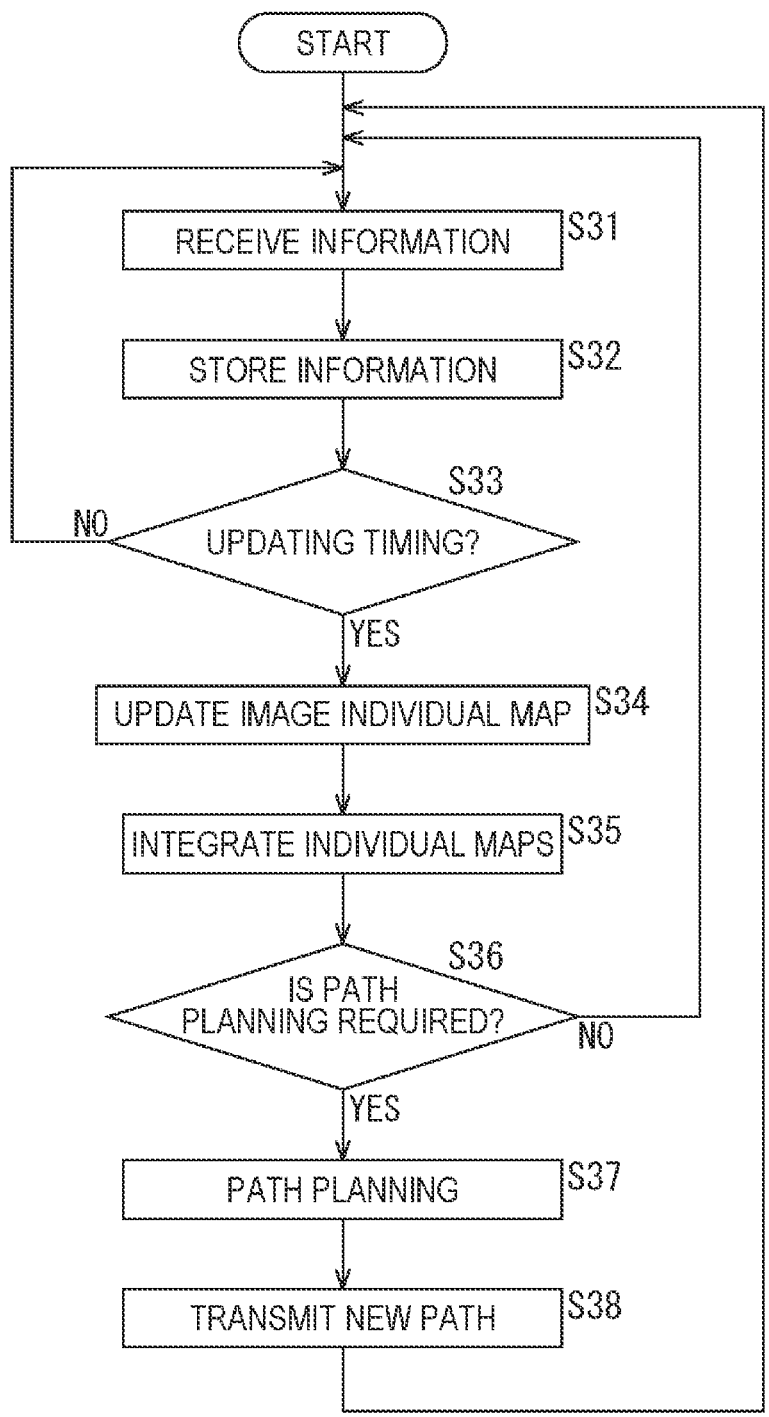
FIG. 12 is a flowchart presenting an example of processing performed by the UTM 10 for an image individual map.
Figure 13:
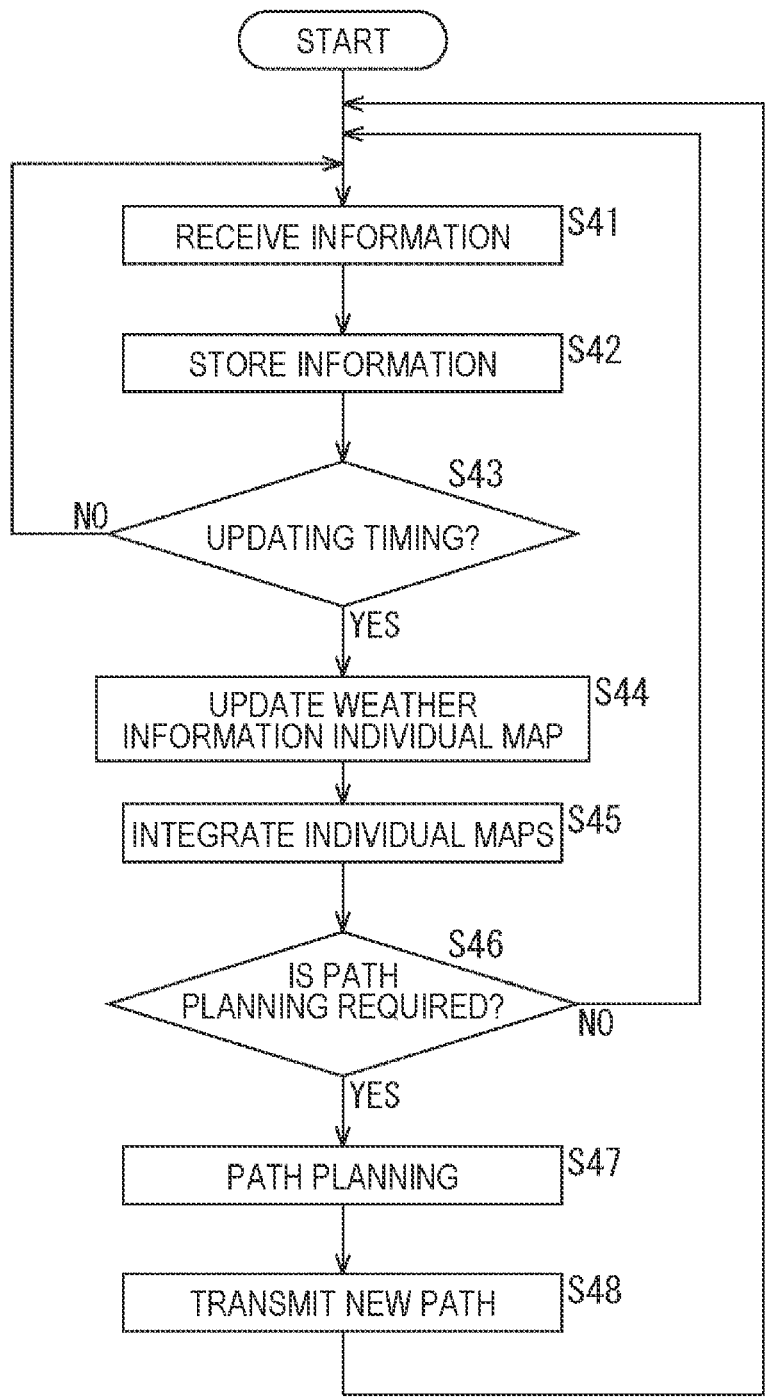
FIG. 13 is a flowchart presenting an example of processing performed by the UTM 10 for a weather information individual map.
Figure 14:
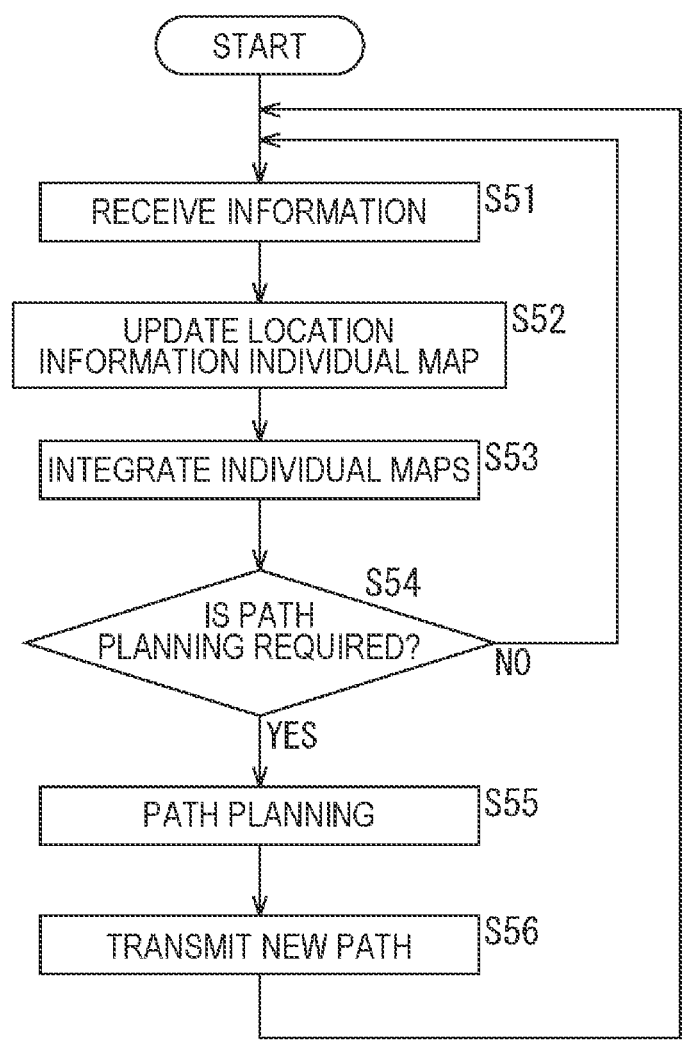
FIG. 14 is a flowchart presenting an example of processing performed by the UTM 10 for a location information individual map.

FIGS. 12 to 14 are flowcharts illustrating other examples of the processing of the UTM 10 of FIG. 3.

Here, the imaging region appearing in the imaged images transmitted from the drone 11 and the surveillance camera 13 is a region near the locations of the drone 11 and the surveillance camera 13 when the imaged images are imaged, and is a part of the registration region of the cost map as an image individual map. Therefore, if the entire image individual map is generated again every time the imaged images are transmitted from the drone 11 and the surveillance camera 13, it takes time and effort.

Therefore, regarding the image individual map, it is possible to update only the cost for a region in which the value has changed from the cost obtained using an existing imaged image, for example, a region in which the cost obtained using the latest imaged image has changed, among the regions appearing in the latest imaged images transmitted from the drone 11 and the surveillance camera 13, in the registration region of the image individual map updated or generated immediately before.

Update of (the cost of) the image individual map can be performed every time an imaged image is transmitted from the drone 11 or the surveillance camera 13, or can be performed by storing imaged images transmitted from the drone 11 and the surveillance camera 13 and using imaged images (imaged images acquired in a certain period) stored at a constant period (regularly). Alternatively, update of the image individual map can be performed by storing imaged images transmitted from the drone 11 and the surveillance camera 13 and irregularly using the imaged images (imaged images acquired in a certain period) stored until now since the update of immediately before the image individual map.

The weather information individual map generated or updated using the weather information transmitted from the drone 11 can also be generated or updated similarly to the image individual map.

For the location information individual map generated or updated using the location information transmitted from the smartphone 51, the location information can be simultaneously acquired from the smartphone 51 existing in the registration region of the location information individual map.

Therefore, update of the location information individual map can be efficiently performed by updating not only the cost for the region in which the cost has changed but also the cost for the entire registration region of the location information individual map, such as the image individual map and the weather information individual map.

FIG. 12 is a flowchart presenting an example of the processing performed by the UTM 10 for an image individual map.

In step S31, in the UTM 10, the information reception unit 31 of the cost map generation unit 21 waits for imaged images to be transmitted from the drone 11 and the surveillance camera 13, receives the imaged images asynchronously, and supplies the imaged images to the individual map generation unit 32, and the processing proceeds to step S32.

In step S32, the individual map generation unit 32 stores the imaged image from the information reception unit 31 into a built-in memory not illustrated, and the processing proceeds to step S33.

In step S33, the individual map generation unit 32 determines whether the current time is the update timing for updating the image individual map.

In a case where it is determined in step S33 that the current time is not the update timing, for example, in a case where a predetermined period has not elapsed since the previous update of the image individual map, the processing returns to step S31, and the similar processing is repeated thereafter.

Furthermore, in a case where it is determined in step S33 that the current time is the update timing, for example, in a case where a predetermined period has elapsed since the previous update of the image individual map, the processing proceeds to step S34.

In step S34, using the imaged images stored in the memory until now after the previous update of the image individual map, the individual map generation unit 32 updates and supplies, to the integration unit 35, the image individual map, and the processing proceeds to step S35.

In step S35, the integration unit 35 integrates the latest image individual map supplied from the individual map generation unit 32, the latest location information individual map supplied from the individual map generation unit 33, and the latest weather information individual map supplied from the individual map generation unit 34, and generates an integrated map as a final cost map. Then, the integration unit 35 supplies the integrated map to the path planning unit 22, and the processing proceeds from step S35 to step S36.

In step S36, the path planning unit 22 determines whether it is necessary to generate or regenerate the path plan.

In a case where it is determined in step S36 that it is not necessary to generate and regenerate the path plan, the processing returns to step S31, and similar processing is repeated thereafter.

Furthermore, in a case where it is determined in step S33 that it is necessary to generate or regenerate the path plan, the processing proceeds to step S37.

In step S37, the path planning unit 22 generates a path plan using the cost map as the latest final map from the integration unit 35, and the processing proceeds to step S38.

In step S38, the path planning unit 22 transmits the path plan generated in the immediately preceding step S37 to the drone 11. Then, the processing returns from step S38 to step S31, and similar processing is repeated thereafter.

FIG. 13 is a flowchart presenting an example of the processing performed by the UTM 10 for a weather information individual map.

In step S41, in the UTM 10, the information reception unit 31 of the cost map generation unit 21 waits for weather information to be transmitted from the drone 11, receives the weather information asynchronously, and supplies the weather information to the individual map generation unit 34, and the processing proceeds to step S42.

In step S42, the individual map generation unit 34 stores the weather information from the information reception unit 31 into a built-in memory not illustrated, and the processing proceeds to step S43.

In step S43, the individual map generation unit 34 determines whether the current time is the update timing for updating the weather information individual map.

In a case where it is determined in step S43 that the current time is not the update timing, for example, in a case where a predetermined period has not elapsed since the previous update of the weather information individual map, the processing returns to step S41, and the similar processing is repeated thereafter.

Furthermore, in a case where it is determined in step S43 that the current time is the update timing, for example, in a case where a predetermined period has elapsed since the previous update of the weather information individual map, the processing proceeds to step S44.

In step S44, using the weather information stored in the memory until now after the previous update of the weather information individual map, the individual map generation unit 34 updates and supplies, to the integration unit 35, the weather information individual map, and the processing proceeds to step S45.

In steps S45 to S48, processing similar to those in steps S35 to S38, respectively, in FIG. 12 are performed.

FIG. 14 is a flowchart presenting an example of the processing performed by the UTM 10 for a location information individual map.

In step S51, in the UTM 10, the information reception unit 31 of the cost map generation unit 21 regularly or irregularly requests the location information from each smartphone 51 existing in the registration region of the location information individual map. By receiving the location information transmitted from the smartphone 51 in response to the request for the location information, the information reception unit 31 collectively acquires the location information of each smartphone 51 existing in the registration region of the location information individual map.

The acquisition of the location information of each smartphone 51 existing in the registration region of the location information individual map as described above can be performed using an application programming interface (API) that collectively acquires the location information of the smartphones 51 such as Google Map of Google Inc, for example.

The information reception unit 31 supplies, to the individual map generation unit 33, the location information of each smartphone 51 existing in the registration region of the location information individual map, and the processing proceeds from step S51 to step S52.

In step S52, the individual map generation unit 33 updates and supplies, to the integration unit 35, the location information individual map using the location information acquired in the immediately preceding step S51, and the processing proceeds to step S53.

In steps S53 to S56, processing similar to those in steps S35 to S38, respectively, in FIG. 12 are performed.

The UTM 10 to which the present technology is applied has been described above, and the function of the UTM 10 can be equipped on the drone 11, for example.

<Description of Computer to which Present Technology is Applied>

Next, the above-described series of processing can be performed by hardware or can be performed by software. In a case where the series of processing is performed by software, a program constituting the software is installed in a general-purpose computer or the like.

Figure 15:
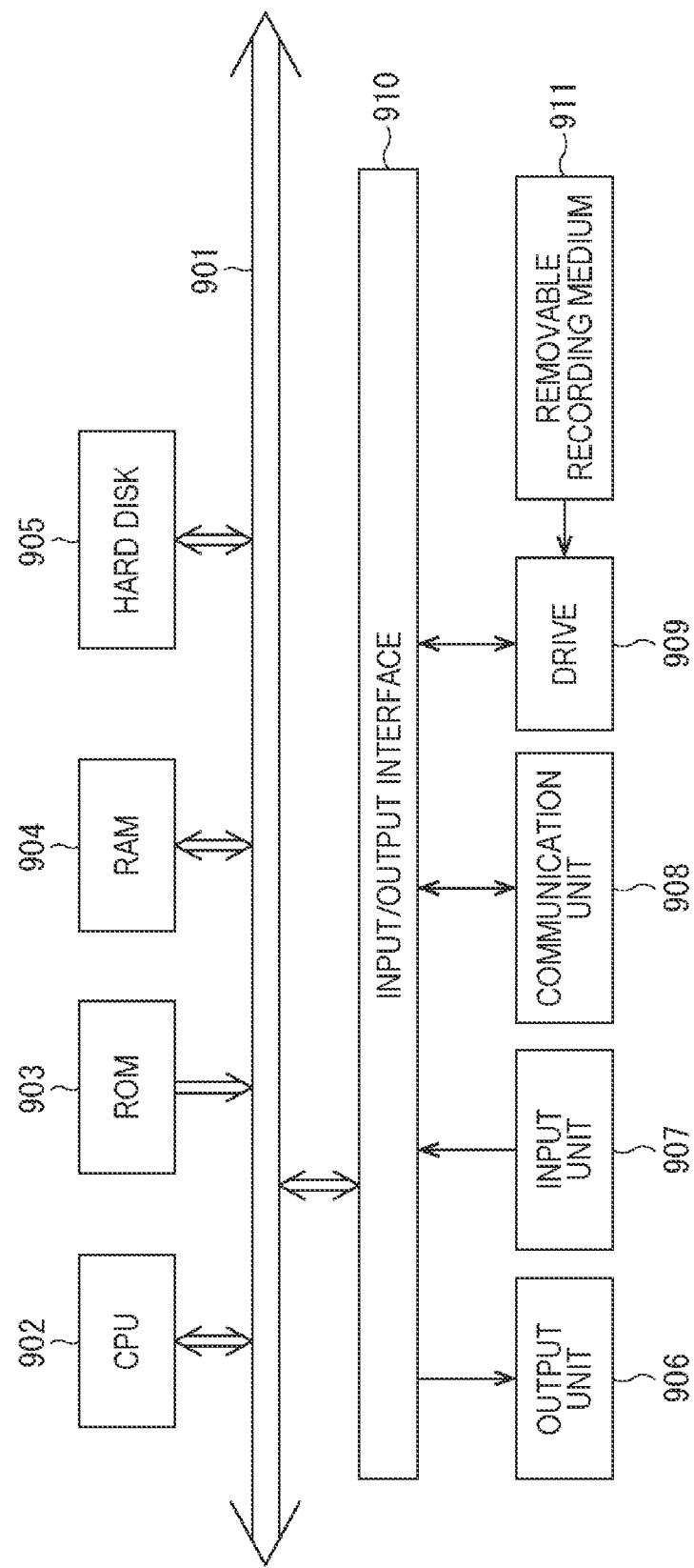
FIG. 15 is a block diagram presenting a configuration example of an embodiment of a computer to which the present technology is applied.

FIG. 15 is a block diagram presenting a configuration example of an embodiment of a computer in which a program for executing the above-described series of processing is installed. For example, the computer of FIG. 15 can be adopted as a hardware configuration of the UTM 10.

The program can be recorded in advance in a hard disk 905 or a ROM 903 as a recording medium built in the computer.

Alternatively, the program can be stored (recorded) in a removable recording medium 911 driven by a drive 909. Such a removable recording medium 911 can be provided as so-called packaged software. Here, examples of the removable recording medium 911 include, for example, a flexible disk, a compact disc read only memory (CD-ROM), a magneto optical (MO) disk, a digital versatile disc (DVD), a magnetic disk, a semiconductor memory, and the like.

Note that the program can be installed in the computer from the removable recording medium 911 as described above, or can be downloaded to the computer via a communication network or a broadcast network and installed in the built-in hard disk 905. That is, the program can be transferred wirelessly from, for example, a download site to the computer via an artificial satellite for digital satellite broadcasting, or can be transferred by wire to the computer via a network such as a local area network (LAN) or the Internet.

The computer incorporates a central processing unit (CPU) 902, and an input/output interface 910 is connected to the CPU 902 via a bus 901.

When a command is input by a user operating or the like an input unit 907 via the input/output interface 910, the CPU 902 executes a program stored in a read only memory (ROM) 903 according to the command. Alternatively, the CPU 902 loads a program stored in the hard disk 905 into a random access memory (RAM) 904 and executes the program.

Therefore, the CPU 902 performs processing according to the above-described flowchart or processing performed by the configuration of the above-described block diagram. Then, the CPU 902 outputs the processing result from, for example, an output unit 906, transmits the processing result from a communication unit 908, or records the processing result in the hard disk 905 via the input/output interface 910 as necessary.

Note that the input unit 907 includes a keyboard, a mouse, a microphone, and the like. Furthermore, the output unit 906 includes a liquid crystal display (LCD), a speaker, and the like.

Here, in the present description, the processing performed by the computer according to the program is not necessarily performed in time series along the order described in the flowchart. That is, the processing executed by the computer according to the program includes processing executed in parallel or individually (for example, parallel processing or object processing).

Furthermore, the program may be processed by one computer (processor) or may be processed by a plurality of computers in a distributed manner. Moreover, the program may be transferred to a remote computer and executed.

Moreover, in this description, the system means a set of a plurality of configuration elements (apparatuses, modules (components), and the like), and it does not matter whether or not all the configuration elements are in a same housing. Therefore, a plurality of apparatuses housed in separate housings and connected via a network and one apparatus in which a plurality of modules is housed in one housing are both systems.

Note that the embodiment of the present technology is not limited to the above-described embodiment, and various modifications can be made in a scope without departing from the spirit of the present technology.

For example, the present technology can have a configuration of cloud computing in which one function is shared by a plurality of apparatuses via a network and is processed in cooperation.

Furthermore, each step explained in the above-described flowcharts can be executed by one apparatus or executed by a plurality of apparatuses in a shared manner.

Moreover, in a case where one step includes a plurality of processing, the plurality of processing included in the one step can be executed by one apparatus or executed by a plurality of apparatuses in a shared manner.

Furthermore, the effects described in the present description are merely examples not to be limited thereto, and other effects may be present.

Note that the present technology can have the following configurations.

<1>
An information processing apparatus including:
a cost map generation unit that generates a cost map indicating a risk of passing through a region by using crowd information.

<2>
The information processing apparatus according to <1>, in which
the cost map generation unit detects a crowd by using an image, and generates the crowd information.

<3>
The information processing apparatus according to <2>, in which
the cost map generation unit detects a person using the image, and detects the crowd using a detection result of the person.

<4>
The information processing apparatus according to <2> or <3>, in which
the image is an image imaged by a camera equipped on a mobile body or an image of a surveillance camera.

<5>
The information processing apparatus according to <4>, in which
the mobile body is an unmanned aerial vehicle (UAV).

<6>
The information processing apparatus according to any of <2> to <5>, in which
the cost map generation unit generates the cost map using an image acquired in a certain period.

<7>
The information processing apparatus according to any of <2> to <6>, in which
the cost map generation unit updates a cost for a region changed from a cost obtained using an existing image in the cost map.

<8>
The information processing apparatus according to any of <1> to <7>, in which
the cost map generation unit sets a cost for a crowd region according to an area, in a real world or on an image, of the crowd region where a crowd is present.

<9>
The information processing apparatus according to any of <1> to <8>, in which
the cost map generation unit detects a crowd using location information of a mobile terminal and generates the crowd information.

<10>
The information processing apparatus according to any of <1> to <9>, in which
the cost map generation unit generates the cost map regularly or irregularly.

<11>
The information processing apparatus according to <10>, in which
the cost map generation unit resets a cost for a region in which a certain period has elapsed from registration of a cost.

<12>
The information processing apparatus according to <11>, in which
the cost map generation unit uses event information regarding an event where people gather to reset a cost for a region in which a certain period has elapsed from registration of a cost, targeting only a cost for a non-event region other than an event region in which an event is taking place in the cost map.

<13>
The information processing apparatus according to any of <1> to <10>, in which
the cost map generation unit generates the cost map by further using weather information.

<14>
The information processing apparatus according to any of <1> to <13>, in which
the cost map generation unit generates the cost map by further using event information regarding an event where people gather.

<15>
The information processing apparatus according to <1>, in which
the cost map generation unit
generates an individual map that is an individual cost map for each piece of information of a plurality of types of modal including at least information from which the crowd information is obtained, and generates a final cost map by integrating the individual map for each piece of information of the plurality of types of modal.

<16>

The information processing apparatus according to <15>, in which
information of the plurality of types of modal includes an image or location information of a mobile terminal, and
the cost map generation unit detects a crowd by using the image or the location information of the mobile terminal, and generates the crowd information.

<17>

The information processing apparatus according to <16>, in which
the cost map generation unit integrates the individual map by selecting a cost indicating a highest risk from costs registered in the individual map for each piece of information of the plurality of types of modal. <18>
The information processing apparatus according to any of <1> to <17> further including:
a path planning unit that generates a path plan of a mobile body using the cost map.

<19>

An information processing method including:
generating a cost map indicating a risk of passing through a region by using crowd information.

<20>

A program for causing a computer to function as
a cost map generation unit that generates a cost map indicating a risk of passing through a region by using crowd information.

REFERENCE SIGNS LIST

10 UTM
11 Drone
13 Surveillance camera
21 Cost map generation unit
22 Path planning unit
31 Information reception unit
32 to 34 Individual map generation unit
35 Integration unit
51 Smartphone
52 Web server
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. An information processing apparatus, comprising:
a Central Processing Unit (CPU) configured to:
detect a crowd based on images and location information, wherein
the images are imaged by a camera equipped on a mobile body and a surveillance camera, and
the location information is acquired from the mobile body, the surveillance camera, and at least one mobile communication device;
receive event information from a server;
generate crowd information based on the detected crowd and the event information received from the server;
generate a cost map indicating a risk of passing through a region based on the crowd information;
generate an individual map that is an individual cost map for each piece of information of a plurality of types of modal including at least information from which the crowd information is obtained;
integrate the individual map based on selection of a cost indicating a highest risk from costs registered in the individual map for each piece of information of the plurality of types of modal; and
generate a final cost map based on the integration of the individual map for each piece of information of the plurality of types of modal, wherein each piece of information of the plurality of types of modal includes the images or the location information of a mobile terminal.

2. The information processing apparatus according to claim 1, wherein the CPU is further configured to:
detect a person based on the images, and
detect the crowd based on a detection result of the person.

3. The information processing apparatus according to claim 1, wherein the mobile body is an unmanned aerial vehicle (UAV).

4. The information processing apparatus according to claim 1, wherein the CPU is further configured to generate the cost map based on an image of the images acquired in a certain period.

5. The information processing apparatus according to claim 1, wherein the CPU is further configured to update a cost for a region from a cost that is obtained based on an existing image in the cost map.

6. The information processing apparatus according to claim 1, wherein the CPU is further configured to set a cost for a crowd region based on an area, in a real world or on an image, of the crowd region where the crowd is present.

7. The information processing apparatus according to claim 1, wherein the CPU is further configured to generate the cost map one of regularly or irregularly.

8. The information processing apparatus according to claim 7, wherein the CPU is further configured to reset a cost for a region in which a certain period has elapsed from registration of a cost.

9. The information processing apparatus according to claim 8, wherein
the CPU is further configured to utilize the event information to reset the cost for the region in which the certain period has elapsed from the registration of the cost,
the event information is associated with an event where people gather, and
the reset of the cost targets only a cost for a non-event region other than an event region in which an event takes place in the cost map.

10. The information processing apparatus according to claim 1, wherein the CPU is further configured to generate the cost map based on weather information.

11. The information processing apparatus according to claim 1, wherein the event information is associated with an event where people gather.

12. The information processing apparatus according to claim 1, wherein the CPU is further configured to generate a path plan of the mobile body based on the cost map.

13. The information processing apparatus according to claim 1, wherein the at least one mobile communication device corresponds to a smartphone.

14. An information processing method, comprising:
- detecting, by a Central Processing Unit (CPU), a crowd based on images and location information, wherein
  - the images are imaged by a camera equipped on a mobile body and a surveillance camera, and
  - the location information is acquired from the mobile body, the surveillance camera, and at least one mobile communication device;
- receiving, by the CPU, event information from a server;
- generating, by the CPU, crowd information based on the detected crowd and the event information received from the server;
- generating, by the CPU, a cost map indicating a risk of passing through a region based on the crowd information;
- generating, by the CPU, an individual map that is an individual cost map for each piece of information of a plurality of types of modal including at least information from which the crowd information is obtained;
- integrating, by the CPU, the individual map based on selection of a cost indicating a highest risk from costs registered in the individual map for each piece of information of the plurality of types of modal; and
- generating, by the CPU, a final cost map based on the integration of the individual map for each piece of information of the plurality of types of modal, wherein each piece of information of the plurality of types of modal includes the images or the location information of a mobile terminal.

15. A non-transitory computer readable medium, having stored thereon, computer executable code, which when executed by a processor, cause the processor to execute operations, the operations comprising:
- detecting a crowd based on images and location information, wherein
  - the images are imaged by a camera equipped on a mobile body and a surveillance camera, and
  - the location information is acquired from the mobile body, the surveillance camera and at least one mobile communication device;
- receiving event information from a server;
- generating crowd information based on the detected crowd and the event information received from the server;
- generating a cost map indicating a risk of passing through a region based on the crowd information;
- generating an individual map that is an individual cost map for each piece of information of a plurality of types of modal including at least information from which the crowd information is obtained;
- integrating the individual map based on selection of a cost indicating a highest risk from costs registered in the individual map for each piece of information of the plurality of types of modal; and
- generating a final cost map based on the integration of the individual map for each piece of information of the plurality of types of modal, wherein each piece of information of the plurality of types of modal includes the images or the location information of a mobile terminal.

* * * * *